UNITED STATES PATENT OFFICE 1,981,186

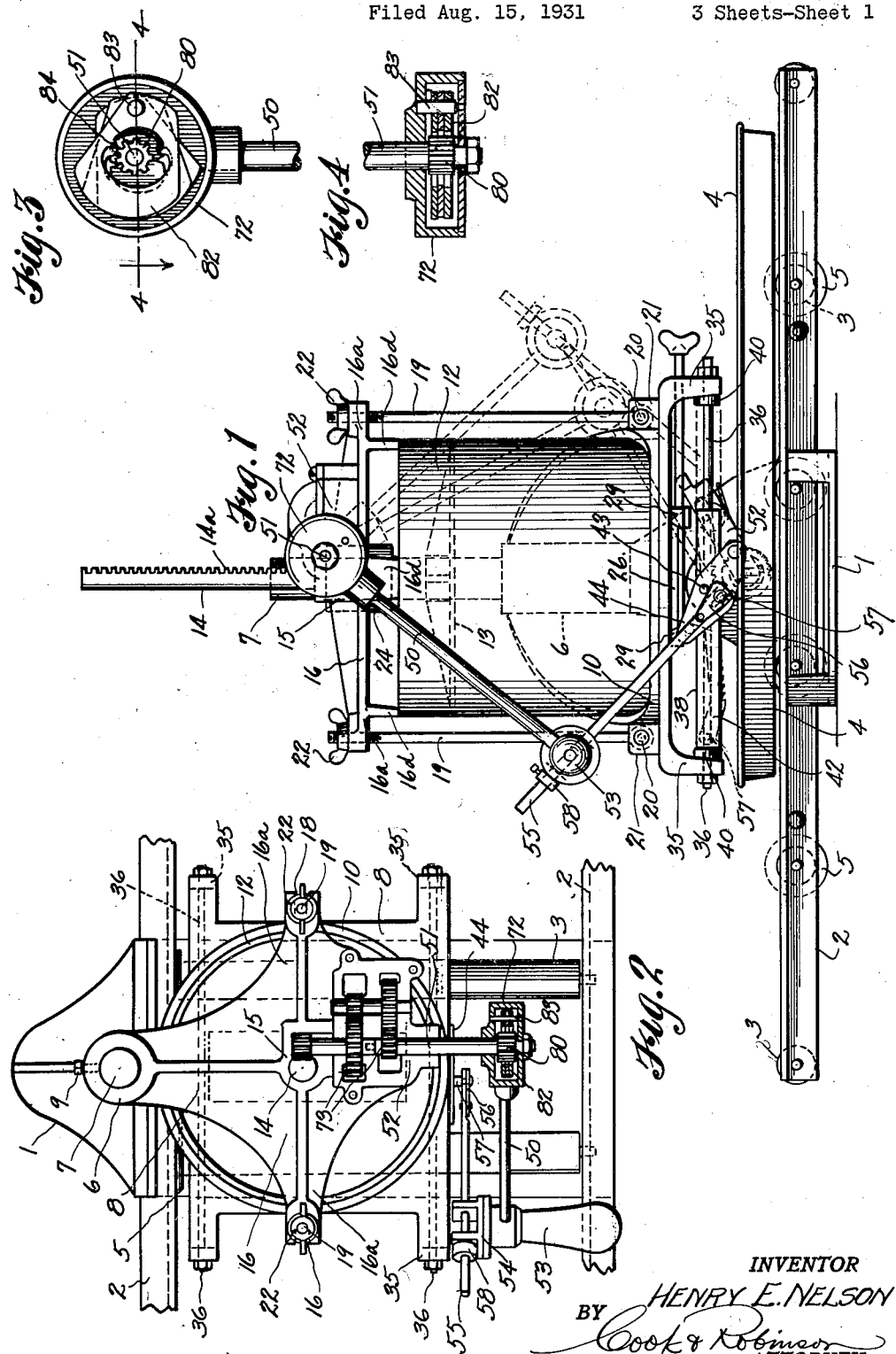

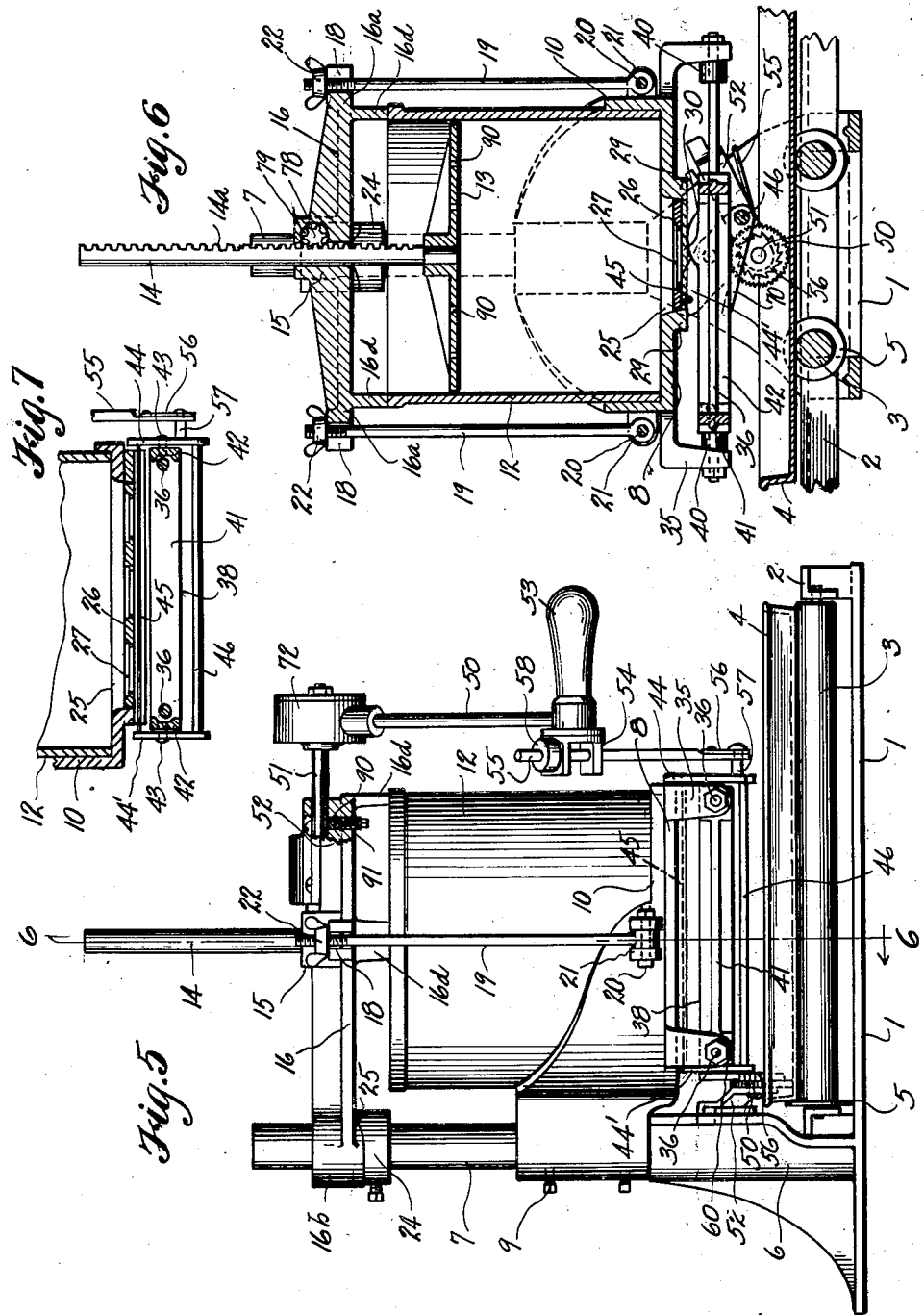

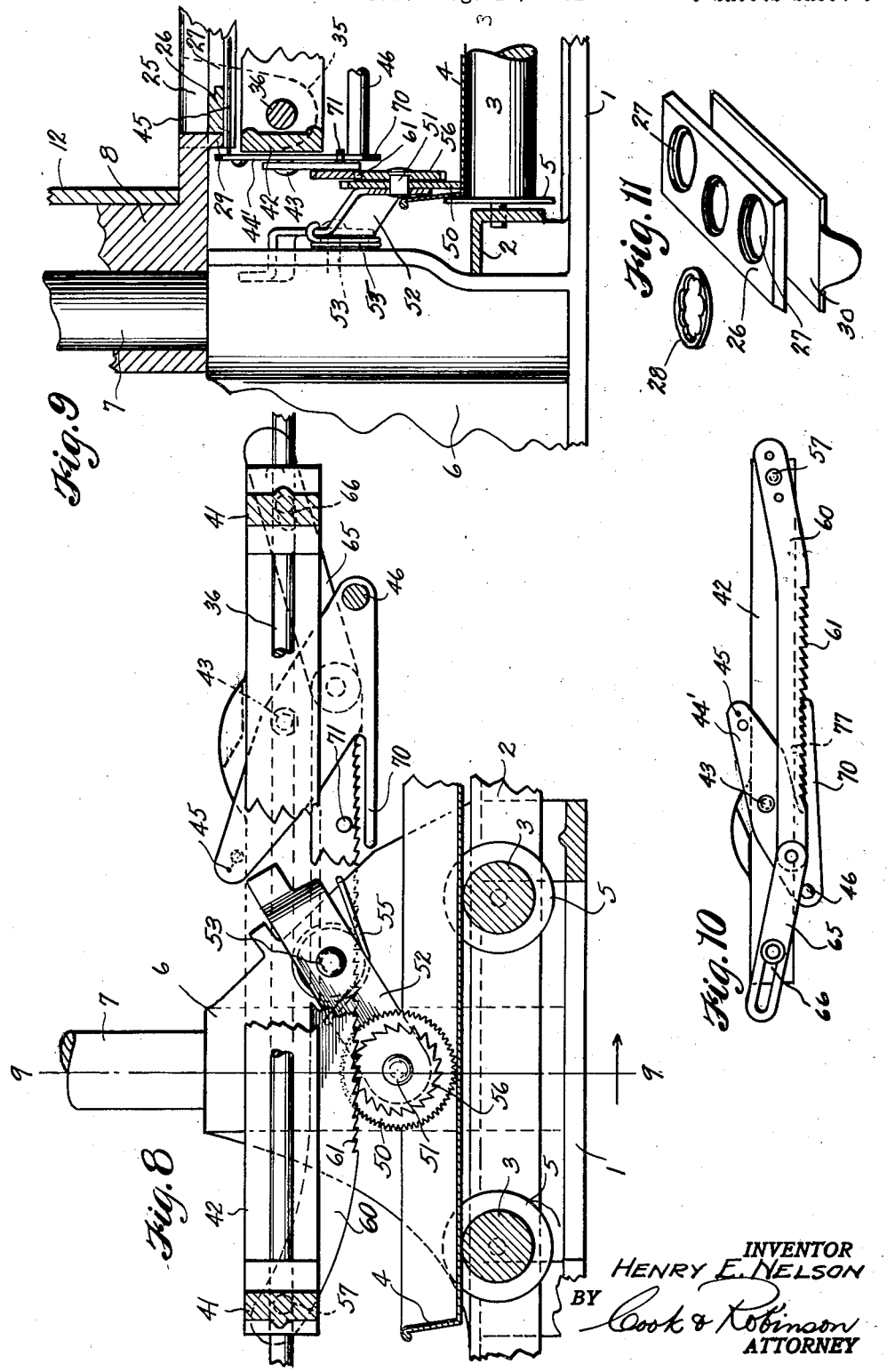

COOKY MOLDING MACHINE

Henry E. Nelson, Everett, Wash.

Application August 15, 1931, Serial No. 557,280

4 Claims. (Cl. 107—29)

This invention relates to cooky molding machines, and more particularly to a machine for automatically molding and cutting cookies, or the like, and for depositing them in a pan for baking; it being the principal object of the invention to provide a manually operated, automatic machine whereby cookies of a selected size and shape may be pressed from a dough container, cut off and delivered into the baking pan as the pan is automatically advanced in a manner whereby the cookies will be properly placed therein and without requiring further attention of the operator.

More specifically stated, the present invention resides in the provision of a machine of the above character comprising, first, a frame structure which mounts a series of horizontal rolls upon which a baking pan may be placed and advanced; second, a dough container supported in spaced relation above the pan and having a base opening fitted with an apertured mold plate through which the dough is pressed by an automatic downward feeding action thereagainst of a presser plate; third, a reciprocally movable cutoff frame, including a cutting wire movable back and forth across the under face of the mold plate to cut off the dough as it is pressed from the mold plate apertures, thereby to form the individual cookies and to drop these into the pan; and fourth, a mechanism operated by the movement of the cutoff frame to advance the pan intermittently at proper intervals for spacing the cookies in the pan.

Other objects of the invention reside in the various details of construction and mode of operation of the parts, particularly those for automatically advancing the dough feeding piston and for actuating the cutoff mechanism and for advancing the pan.

In accomplishing these and other objects of the invention, I have provided the improved details of construction, the preferred forms of which are illustrated in the accompanying drawings, wherein—

Figure 1 is a front elevation of a cooky-making machine constructed in accordance with the present invention.

Figure 2 is a plan view of the machine with the cover plate of the gear case removed for better illustration.

Figure 3 is a front view of the ratchet mechanism connecting the actuating lever with the piston feed shaft.

Figure 4 is a horizontal section on the line 4—4 in Figure 3 of the ratchet mechanism.

Figure 5 is a side elevation of the machine; a part being in section for better illustration.

Figure 6 is a vertical section taken substantially on the line 6—6 in Figure 5.

Figure 7 is a sectional detail illustrating the supporting means for the cutoff wire.

Figure 8 is a sectional detail of the reciprocating carrier for the cutoff mechanism and the means for automatically advancing the baking pan to receive the cookies.

Figure 9 is a cross section taken substantially on the line 9—9 in Figure 8.

Figure 10 is an elevation of the cutoff frame and pan advancing rack as seen from the side of the frame opposite that shown in Figure 8.

Figure 11 is a perspective view of the die plate.

Referring more in detail to the drawings—

In a preferred form of construction the present device comprises a base frame 1 which supports two parallel and horizontally extending angle bars 2—2 between which a plurality of rolls 3 are mounted for travel thereon of a baking pan 4 which may be of an ordinary form used for cooky baking. As here shown there are six of these pan supporting rolls, and they are suitably spaced to properly support the pan throughout its travel in the filling operation, and certain of these rolls are provided with end flanges 5 which serve as means for accurately guiding the pan in its travel.

Centrally at one side of the frame is an upright casting 6 which supports a vertical shaft or standard 7 and on this standard a bracket 8 is adjustably fixed by means of set screws 9 threaded therethrough and against the shaft. This bracket is arranged to horizontally overlie the base frame above the pan and it is equipped with a circular upstanding flange 10 within which is retained the lower end portion of a cylindrical container 12 for the dough from which the cookies are to be made. This container is removable from the support in order that the various parts may be more easily cleaned after use, but otherwise it could be made as a part of the base bracket.

A presser 13 is fitted within the container and is operable against the dough to press it downwardly, and this is actuated by a central vertical rod 14 fixed thereto and slidably contained in a central bearing 15 formed as a part of a bracket arm 16 overlying the upper end of the container in spaced relation thereto. This bracket arm is pivoted on the upper end portion of the standard 7 and, as seen in Figure 2, it has lateral extensions 16a overlying the opposite side edges of the container, which in turn are provided with lateral slots or recesses 18 to receive and contain therein the upper end portions of clamping rods 19, which are pivotally fastened by pins 20 through their lower ends to lugs 21 cast on the base bracket, and at their upper ends they have wing nuts 22 threaded thereon, which are adapted to be tightened downwardly against the extensions of the bracket arm 16 to clamp and hold the latter against the upper end of the container. With the presser raised clear of the container and the clamping rods released, the bracket 16 may then be swung laterally in either direction about the standard 7 to positions out of the way for filing or removing the container.

A collar 24 is fixed on the standard, as shown in Figure 5, and this has an upwardly formed cam portion 25 fitted within a corresponding recess in the hub or mounting portion 16b of the bracket arm 16, so that lateral swinging of the bracket in either direction will cause it to be raised upwardly and free of the end of the container. Downwardly depending legs 16d cast on the outer end of the bracket arm 16 and at the outer ends of the laterally extending portions to rest upon the rim of the container when the bracket is in normal position.

The base bracket 8 provides a bottom for the container 12 and this wall is provided with an opening 25 transversely of the container and within this opening a die plate 26 is removably fitted. The die plate as seen in Figure 11 has a plurality of openings 27 therein through which dough from a supply in the container may be pressed by reason of downward pressure of the piston thereagainst. The openings 27 as here shown as circular in form, but it is to be understood that various forms of dies may be applied to these openings to form cookies of various shapes or design, one being designated at 28 in Figure 11.

As best shown in Figures 1, and 6, the die plate 26 is slidably contained within a guide formed by parallel, dovetailed ribs 29—29 provided on the underside of the supporting bracket and along opposite sides of the opening 25, and it may be withdrawn forwardly when it is desired to change the form of the dies used therein. Also, in Figure 6, I have indicated a plate 30 as applied within the guide closely beneath the die plate 26 to retain the dough while it is being put under compression within the container preparatory to the cooky molding operation. This retaining plate 30 of course would be removed before the device was put into operation for cutting off the cookies.

Formed on the bracket 8 at opposite sides of the container and in spaced relation, are depending legs 35, and extending between these legs beneath the container and from one side of the bracket to the other, are guide rods 36. These rods are in parallel relationship, in the same horizontal plane and extend in a direction at right angles to the direction of the pan supporting rolls. A rectangular frame 38 is slidably mounted on these rods and may be moved reciprocally thereon through a limited distance. Rubber bumpers 40, or the like, are applied to the opposite end portions of these rods against which the reciprocated frame may engage to cushion it in its movement. This frame, as shown best in Figures 7, 8 and 9, comprises opposite end rails 41—41 and opposite side rails 42—42, and pivotally mounted on the side rails by pins 43 and in alinement at opposite sides of the frame are rocker plates 44—44'. A cutoff wire 45 is drawn taut between the upper ends of these plates and it extends across the reciprocating frame and closely adjacent the under surface of the die plate so that when the frame is reciprocated in one direction the wire operates to cut off any dough that may project downwardly through the openings of the plate, thereby to separate the cookies from the dough supply and drop them into the pan. A cross rod 46 rigidly joins the lower ends of the two rocker plates so that they may be moved together as presently described.

The reciprocating movement of the frame 38 is effected by an oscillating movement of a handle or crank arm 50 which is swingingly mounted on the outer end of a horizontal shaft 51 revolubly contained in a bearing 52 at the outer end of the bracket arm 16. At its lower end the crank arm is provided with a handle 53 whereby it may be oscillated back and forth as indicated in Figure 1. The handle portion is provided at its inner end with an apertured bracket 54 through which a rod 55 is slidably extended. The lower end of the rod has a releasable connection of any desirable type, as at 56, with a pivot pin 57 fixed to and extending outwardly from the rocker plate 44, and at its other end is provided with a stop 58 engageable with the guide bracket.

The construction is such that when the crank arm is moved from the position shown in full lines in Figure 1 to the dotted line position at the right, through the latter part of this movement it will cause the cutoff frame to be advanced from its position at the left hand end of the guide rods to a position at the right hand end. Likewise, when the crank arm is moved from the dotted line position at the right in Figure 1 to the full line position, it will return the cutoff frame along the guide rods to its initial position and thereby carry with it the cutoff wire across the under face of the die plate to cut off the dough which has been pressed through the die plate openings. These cut off pieces of dough form the cookies, and they are dropped into the pan. The rocker plates which carry the cutoff wire, being pivotally mounted, and since the rod 55 connects to the rocker plate 44 through the pivot 57 eccentric of its pivot 43, the shifting of the cutoff frame by reason of pull on the pivot 57 will cause the upper end of plates 44—44' to rock downwardly on each advance movement of the frame to thereby swing the wire away from the die plate so that it will not interfere with the dough then being pressed out from the die openings. On the return the rocker plates swing upwardly by reason of the pull thereon through rod 55.

With each advance movement of the crank arm from left to right the pan is fed forwardly a predetermined distance to receive the next cookies to be cut off. This advancing movement is effected by the feeding action of a knurled roller 50 against the base of the pan, as shown in Figure 8. The roller is rotatably mounted by a pivot 51 on the lower end of a lever 52 carried by a pivot 53 from the casting 5. A coiled spring 55 acts against the lever arm and against the casting to urge the knurled roller tightly against the bottom of the pan. Also, there is a ratchet wheel 56 fixed concentrically to the knurled roller, and pivotally mounted, as at 57, on the cutoff frame is a bar or arm 60 having ratchet teeth 61 adapted to engage with the ratchet wheel when the frame is returned, thereby to rotate the roller 50 and to effect an advancing movement of the pan. The arm 60 is pivotally supported at one end as at 57 seen in Figure 10, and is swingingly attached at its opposite end to the frame by means of a short link 65 pivotally connected thereto, and having a pin and slot connection, as at 66 within the frame. The action of the bar is such that when the cutoff frame is advanced, the pan is moved forwardly, and when the cutoff frame is returned the ratchet arm 60 will be raised free of the ratchet wheel so as to effect no movement of the advancing roller. This lifting of the ratchet arm is effected by means of an extension 70 formed at the lower edge portion of the rocker plate 44' which is arranged to engage with a stud 71 on the arm 60 when the plate is rocked, incident to retraction of the frame. This engagement effects the lifting of the arm 60 free of the ratchet wheel.

The means employed for feeding the dough downwardly within the container is shown best in Figures 2, 3 and 4. The crank arm is mounted rotatably on the outer end of the shaft 51, through the medium of an enclosed housing 72, and it contains a ratchet mechanism, as shown in Figures 3 and 4, whereby swinging of the crank to retract the cutoff frame rotates the shaft through a definite arc. The inner end of the shaft 51 is connected through a reduction gear train 73, shown in Figure 2, with a short shaft 78 carrying a pinion 79 which meshes with the rack teeth 14a of the vertical presser rod 14. The geared connection provides that with each return movement of the crank arm the rod 14 will be advanced downwardly a very short interval, thereby to press the dough outwardly through the openings in the die plate. The amount of this movement, of course, would depend upon the gear ratio, and it may be made to move any desirable extent.

The preferred form of ratchet mechanism shown in Figures 3 and 4 consists of a ratchet gear 80 that is keyed on the outer end of the shaft 51, and a plurality of ratchet plates 82 pivotally mounted on a pin 83 within the housing 72. The ratchet plates have teeth 84 arranged in offset relation to engage with the ratchet wheel and their arrangement is such that the device is very sensitive in its operation and effects movement of the shaft 51 only in one direction. The shaft 51 is held against a return rotative movement by means of a friction block 90 which bears thereagainst and which is held by means of a set screw 91 (see Figure 5) which is threaded upwardly through the bracket 16 against the pressure block.

With the device so constructed, it is readily apparent that oscillating movement of the lever or handle from the full line to the dotted line position shown in Figure 1 will effect a reciprocal action of the cutoff frame and that with each of such return movements the pan will be advanced forwardly a definite interval and the piston will be actuated downwardly in the container a slight distance to effect the pressing out of the dough through the die plate. Also, on each opposite movement of the handle, the cutoff plate will be moved accordingly to cause the cutoff wire to cut through the dough which has been pressed out, thereby to sever the cookies from the supply and drop them into the pan.

Preparatory to a cooky making operation the plate 30 would be inserted below the die plate to close the openings, then the dough would be placed in the container and the plunger or piston fitted in the upper end of the cylinder against the dough. Then by reciprocal action of the handle the piston would be moved downwardly to compress the dough and to squeeze all of the air bubbles from it. In order that this air may escape, the piston is provided with a plurality of perforations, as at 90, and it may be desirable in some instances to place a cloth between the dough and the presser in order to keep the dough from squeezing out through the perforations. However, this cloth would not interfere with the passage of air. After the dough has been sufficiently compressed for cooky making, the plate is removed from beneath the die, and the device is ready for use. Then a pan is placed on the rollers, as seen in Figure 6, and the handle is reciprocated to cut off and deliver the cookies thereinto as previously described. After the pan has been filled by this process, it may be removed by lifting up the advancing roller, then another pan may be inserted, and the action repeated.

Devices of this character are suitable for making cookies, or the like, of various kinds and shapes. The machine may be made in various sizes, according to requirements. It provides a relatively inexpensive and simple machine, suitable for smaller bakeries where heavy and expensive machines are not practicable or desirable.

It is apparent that in the construction of the machine, details might be modified without departure from the spirit of the invention, and it is for this reason that I do not wish to confine the claims to the details herein shown, but intend that they shall be given an interpretation commensurate with the scope of the invention disclosed.

Having thus described my invention, what I claim as new therein and desire to secure by Letters Patent, is:

1. A device of the character described comprising a dough container having base openings, a presser movable in the container maintaining pressure against the dough for pressing it through said openings, means beneath the container on which a pan may be movably supported, a pan on said means, a pan advancing wheel yieldingly engaging the pan, a reciprocally mounted frame, a swingingly mounted handle member, means operatively connecting the handle with the frame to advance and retract it in accordance with like movements of the handle, a cutoff wire carried by the said frame and movable therewith across the container opening with each advance movement to cut off the dough ejected from the openings, for deposit in the pan, and mechanisms operable by the handle on each retractive movement to advance the presser downwardly a definite distance and mechanism operable to rotate the pan advancing wheel to shift the pan forwardly a definite interval.

2. A device of the character described comprising a dough container having a base opening, a die plate fitted in said opening having a plurality of cooky molding openings through which dough may be ejected, a presser movable downwardly in the container against the dough to press it through said openings, a piston rod extended upwardly from the presser, a horizontal frame structure reciprocally movable beneath the container, a rocker frame mounted thereon, a cutoff wire mounted by the rocker frame, pan supporting rolls beneath the container, a pan movable thereon, a shaft having geared connection with the piston rod, a handle member swingingly suspended from said shaft, means operatively connecting the handle to said horizontal frame structure through connection with the said rocker frame for actuating the former back and forth beneath the container and whereby said rocker frame is actuated on each advance movement of the handle to raise the wire to cutoff position in passing beneath the die openings to cut off the dough ejected therefrom for deposit in said pan, and whereby on each retractive movement it is moved downwardly away from the die plate, ratchet mechanism connecting the handle with the said shaft and effective on each retractive movement of the handle to rotate the shaft to advance the piston downwardly, an advancing wheel for the pan and means carried by said horizontal frame for rotating said wheel on each retractive movement of the frame to advance the pan a definite interval.

3. A device of the character described comprising a dough container having base openings, a presser movable in the container maintaining pressure against the dough for pressing it through the said openings, pan supporting and guiding means beneath the container, a pan on said means, a pan advancing wheel yieldingly engaging the pan, a horizontally reciprocating frame beneath the container, a swingingly mounted handle member, means operatively connecting the handle with the frame to reciprocate it beneath the container in accordance with the oscillating movement of the handle, a cut-off member mounted by the said frame and movable therewith across the container openings with each advance movement of the frame to cut off the dough that has been pressed through the openings, mechanism operable by the handle on each retractive movement of the frame to advance the presser downwardly a definite distance and mechanism operable on each retractive movement of the handle to rotate the pan engaging wheel to advance the pan a definite distance and means operable through its connection with the handle for moving the cut-off member downwardly away from the openings on each retractive movement of the handle.

4. A device of the character described comprising a dough container having a discharge opening, a presser member in the container movable against the dough to eject it through the opening, pan supporting and guiding means, a support thereon, a pan advancing wheel yieldingly engaging the pan, a reciprocally movable frame, a cut off wire, means pivotally mounted on the frame, and supporting said wire, a swingingly mounted handle member, a link connecting the handle member and the frame whereby oscillation of the handle will effect reciprocal action of the frame, means mounted on the frame whereby movement thereof in one direction will effect rotation of said wheel to advance the pan on said support and effect adjustment of the presser against the dough to cause it to be extruded through said openings and cause an adjustment of the cut-off wire support to move the wire clear of the extruded dough and, on return movement of the frame, will effect an adjustment of the wire to cut off the extruded dough.

HENRY E. NELSON.